United States Patent [19]

Chao

[11] Patent Number: 4,964,889
[45] Date of Patent: Oct. 23, 1990

[54] SELECTIVE ADSORPTION ON MAGNESIUM-CONTAINING CLINOPTILOLITES

[75] Inventor: Chien-Chung Chao, Millwood, N.Y.
[73] Assignee: UOP, Des Plaines, Ill.
[21] Appl. No.: 445,502
[22] Filed: Dec. 4, 1989
[51] Int. Cl.$^5$ .............................................. B01D 53/04
[52] U.S. Cl. .......................................... 55/58; 55/68; 55/75; 423/239; 423/328
[58] Field of Search ...................... 55/58, 68, 75, 389; 423/239, 328, 331; 502/60, 514

[56] References Cited

U.S. PATENT DOCUMENTS

| | | | |
|---|---|---|---|
| 2,843,219 | 7/1958 | Habgood ................................. | 55/68 |
| 3,218,367 | 11/1965 | Chen ...................................... | 55/75 X |
| 3,262,890 | 7/1966 | Mitchell et al. ...................... | 55/75 X |
| 3,287,281 | 11/1966 | Hader, Jr. et al. ............... | 423/328 X |
| 3,375,065 | 3/1968 | McDaniel et al. ................... | 423/328 |
| 3,405,074 | 10/1968 | Mattox ................................. | 423/328 |
| 3,523,764 | 8/1970 | Uoda et al. ...................... | 423/331 X |
| 3,660,967 | 5/1972 | Collins et al. ....................... | 55/75 X |
| 3,769,386 | 10/1973 | Rundell et al. ..................... | 423/328 |
| 4,059,543 | 11/1977 | Kiovsky et al. .................... | 55/75 X |
| 4,373,935 | 2/1983 | Ausikaitis et al. ................... | 55/75 X |
| 4,415,345 | 11/1983 | Swallow ................................. | 62/30 |

FOREIGN PATENT DOCUMENTS

| | | | |
|---|---|---|---|
| 2347574 | 4/1974 | Fed. Rep. of Germany ........ | 55/389 |
| 61-107941 | 5/1986 | Japan ..................................... | 502/60 |
| 61-255994 | 11/1986 | Japan . | |
| 62-132542 | 6/1987 | Japan . | |
| 63-025210 | 2/1988 | Japan ..................................... | 55/75 |

OTHER PUBLICATIONS

P. W. Atkins, Physical Chemistry, P. 773, Freeman (1982).
T. C. Frankiewicz and R. G. Donnelly, Methane/Nitrogen Separation over the Zeolite Clinoptilolite by Selective Adsorption of Nitrogen, Chap. 11, Industrial Gas Separation, American Chemical Society, 1983.

*Primary Examiner*—Robert Spitzer
*Attorney, Agent, or Firm*—Thomas K. McBride; John G. Tolomei; Warren K. Volles

[57] ABSTRACT

Gases having molecular dimensions equal to or smaller than nitrogen are selectively adsorbed and separated from other gases having molecular dimensions equal to or larger than methane using a clinoptilolite molecular sieve that contains magnesium cations. The clinoptilolite molecular sieves of the present invention can be ion-exchanged with magnesium cations and optionally with other cations such as lithium, sodium, potassium, calcium, barium, strontium, zinc, copper, cobalt, iron and manganese to produce the desired separation characteristics. Processes are disclosed for separating gases by adsorbing at an elevated pressure and regenerating, or desorbing, by reducing the pressure. Methods for the preparation of a magnesium-exchanged clinoptilolite are disclosed.

31 Claims, No Drawings

SELECTIVE ADSORPTION ON MAGNESIUM-CONTAINING CLINOPTILOLITES

FIELD OF THE INVENTION

The present invention relates in general to the separation of gases containing molecules having molecular dimensions equal to or smaller than nitrogen from other gases having molecular dimensions equal to or larger than methane, and more particularly to the use of magnesium-containing clinopotilolite molecular sieves as adsorbents for the separation, and to cyclic processes using such molecular sieves for adsorption in an adsorber bed wherein desorption is accomplished by a reduction in the adsorber bed pressure.

BACKGROUND OF THE INVENTION

The separation of light gases has become increasingly important over the years particularly in areas relating to natural gas recovery and enhanced oil recovery where there can be large amounts of light gases present. Often times, there are appreciable amounts of nitrogen present, as well as other smaller molecules such as carbon dioxide, oxygen and water, which need to be separated from other larger molecules such as methane, ethane, propane, butane and corresponding olefins.

In the natural gas industry, the separation of nitrogen from hydrocarbons, and particularly methane, is of primary interest in order to avoid nitrogen contamination from gas wells into natural gas pipelines. Natural gases which contain significant amounts of nitrogen may not meet minimum heating value specifications, reduce pipeline capacities and require additional compression horsepower and fuel consumption. Furthermore, as high quality gas reserves are gradually being depleted, the natural gas industry is becoming more dependent on lower qualtiy gas which contains larger amounts of nitrogen and other undesired gases. Accordingly, nitrogen removal from natural gases has attained increased importance.

The depletion of oil reserves has also influenced the petroleum industry where successful recovery of petroleum often requires the use of an enhanced recovery technique. One such often used technique involves the injection into the reservoir of a fluid which will not support combustion; an often used fluid for this technique is nitrogen or a nitrogen-containing gas. However, the use of this technique increases the level of nitrogen contaminant in the gas fraction recovered from the reservoir, i.e., the petroleum gases, above their naturally-occurring nitrogen concentration.

Nitrogen injection for enhanced oil recovery introduces a further problem because the nitrogen concentration in the petroleum gases, also known as case-head or well-head gases, does not remain constant over the life of the recovery operation. Although the nitrogen concentration variation will strongly depend upon particular reservoir characteristics, a general pattern is predictable. Typically during the first few years that enhanced recovery with nitrogen injection is employed, the nitrogen concentration in the gases may remain at about the naturally-occurring level, increasing thereafter as more nitrogen injection is required to recover the oil.

Hence, in order to render the use of nitrogen effective for enhanced oil and gas recovery, processes which are both cost effective and tolerant to compositional variations are required to separate nitrogen from methane and other gases.

The nitrogen contaminant can be removed from the nitrogen-containing gas by distillation. For example, U.S. Pat. No. 4,415,345 discloses a solution to this problem by providing processes that utilize distillation to remove nitrogen from natural gas streams, wherein a nitrogen heat pump is employed with both single and double distillation column arrangements to process streams of varying nitrogen content. In general, however, distillation processes such as described in the above-mentioned patent are well suited only for larger-scale operations due to their relatively high equipment costs and complex operating procedures.

In smaller-scale natural gas operations as well as in other areas such as synthesis gas and coke oven gas processing, adsorption processes can be especially well suited. The adsorption capacities of adsorption units can, in many cases, be readily adapted to process gas mixtures of varying nitrogen content without equipment modifications, i.e., by adjusting adsorption cycle times. Moreover, adsorption units can be conveniently skid-mounted, thus providing easy mobility between gas processing locations. Further, adsorption processes are often desirable because more than one component can be removed from the gas. As noted above, nitrogen-containing gases often contain other gases that contain molecules having smaller molecular dimensions than nitrogen, e.g., for natural gas, carbon dioxide, oxygen and water, and for coke oven gas, carbon monoxide.

However, despite the advantageous aspects of adsorption processes, the adsorptive separation of nitrogen from methane has been found to be particularly difficult. The primary problem is in finding an adsorbent that has sufficient selectivity for nitrogen over methane in order to provide a commercialy viable process. In general, selectivity is related to polarizability, and methane is more polarizable than nitrogen, i.e. The polarizability volumes for nitrogen and methane are respectively, $N_2 = 17.6 \times 10^{-25}$ cm$^{-3}$; $CH_4 = 26.0 \times 10^{-25}$ cm$^{-3}$. See P. W. Atkins, PHYSICAL CHEMISTRY, p. 773, Freedman (1982). Therefore, the equilibrium adsorption selectivity of essentially all known adsorbents such as large pore zeolites, carbon, silica gel, alumina etc. all favor methane over nitrogen. However, since nitrogen is a smaller molecule than methane, it is possible to have a small pore zeolite which adsorbs nitrogen faster than methane. Clinoptilolite is one of the zeolites which has been disclosed in literature as rate selective adsorbent for the separation of nitrogen and methane.

The separation of gaseous mixtures of methane and nitrogen using both raw clinoptilolite and clinoptilolite which had been ion-exchanged with calcium cations is described in the following publication; T. C. Frankiewicz and R. G. Donnelly, METHANE/NITROGEN SEPARATION OVER THE ZEOLITE CLINOPTILOLITE BY SELECTIVE ADSORPTION OF NITROGEN, Chapter 11, INDUSTRIAL GAS SEPARATION, American Chemical Society, 1983. They disclose that at long adsorption times, adsorption approaches thermodynamic equilibrium and there is a tendency for adsorbed nitrogen to be replaced by methane. However, since methane diffusion is slower than nitrogen diffusion into clinoptilolite, the separation can be made on a rate basis.

Japanese Patent Application (Kokai) No. 61-255,994 discloses a process for producing a high-caloric gas comprising two adsorption zones wherein nitrogen and other non-combustible low-caloric components are removed from a feed gas, e.g., coke oven gas or methane reaction gas, which also contains hydrogen, methane and other hydrocarbons. This Japanese patent application discloses that the nitrogen is adsorbed on a clinoptilolite adsorbent that may be naturally produced clinoptilolite, natural clinoptilolite that has been crushed as required either in its original form or after ion exchange or other chemical treatment, natural clinoptilolite that has been combined with a suitable binder, then compacted and sintered, natural clinoptilolite that has merely been heat-treated, or from clinoptilolite obtained by a synthetic process. This Japanese patent application does not, however, disclose any specific cations that would be suitable as ion-exchange agents in clinoptilolite for adsorbing nitrogen or smaller molecules.

Japanese Patent Application (Kokai) No. 62-132,542 discloses an adsorbing and separating composition composed of a clinoptilolite type zeolite containing calcium cations in a mole ratio of $CaO/Al_2O_3$ of 0.4 to 0.75. The application discloses the composition is useful for separating molecules with a kinetic diameter of less than 3.7 angstroms from molecules with that of 3.7 angstroms or greater, e.g., removal of small quantity of nitrogen from methane gas, or bulk separation of nitrogen from a methane-containing coke oven gas or coal mine draught gas, etc.

Although the above-described references propose various adsorbents and processes for separating nitrogen from methane other gases, more efficient and effective adsorbents and commerically viable processes are sought. In particular, it is desired to provide adsorbents and processes that are particularly useful for separating nitrogen or smaller molecules from methane or larger molecules.

SUMMARY OF THE INVENTION

By the present invention, processes are provided for separating gases having molecular dimensions equal to or smaller than nitrogen from other gases having molecular dimensions equal to or larger than methane. This separation is achieved by using a clinoptilolite molecular sieve that contains magnesium cations. In order for the clinoptilolites of the present invention to have sufficient capacity and selectivity for commercial use, it is necessary that the magnesium cation content be at least 5 equivalent percent of the ion-exchangeable cations in the clinoptilolite molecular sieve.

One aspect of the present invention provides a process for separating a gas containing molecules having molecular dimensions equal to or smaller than nitrogen from a feed containing mixtures thereof with at least one other gas containing molecules having molecular dimensions equal to or larger than methane. The process comprises contacting the feed with a clinoptilolite molecular sieve that has a magnesium cation content that is sufficient to cause the gas to be selectively adsorbed on the clinoptilolite molecular sieve, where the magnesium cation content is at least about 5 equivalent percent of the ion-exchangeable cations in the clinoptilolite molecular sieve, and recovering an effluent having a reduced amount of the gas relative to the feed. The clinoptilolite can be ion-exchanged with magnesium cations in order to establish the desired level. Additionally, the clinoptilolite can be ion-exchanged with at least one other cation selection from potassium, lithium, sodium, calcium, barium, strontium, zinc, copper, cobalt, iron and manganese cations to an extent that not more than about 95 equivalent percent of the ion-exchangeable cations are these cations.

Another aspect of the present invention provides a pressure-swing, adsorption process for the selective adsorption of molecules having molecular dimensions equal to or smaller than nitrogen, e.g., carbon monoxide, from a gaseous mixture on a clinoptilolite molecular sieve that has a magnesium cation content of at least about 5 equivalent percent of the ion-exchangeable cations, using adsorption temperatures and pressures effective for the adsorption of the gas, e.g., from about $-50°$ to $100°$ C. and from about 0.2 psia to 1500 pisa, and using desorption tempertures and pressures effective for the desorption of the gas, e.g., pressures lower than those used for the adsorption, often within the range of 0.1 torr to 150 psia. Preferably, the adsorption if performed at a temperature of from about $0°$ to $50°$ C. and at a pressure of from about 50 psia to 500 psia, and desorption is performed at a pressure of from about 0.1 torr to 15 psia.

Still another aspect of the present invention provides a process for the production of a modified clinoptilolite wherein at least about 5 equivalent percent of the ion-exchangeable cations in the clinoptilolite comprises magnesium cations. The process includes the steps of subjecting a clinoptilolite to at least one ion-exchange with a solution containing any one or more of lithium, potassium, calcium, sodium, barium, strontium, zinc, copper, cobalt, iron and manganese cations, thereby producing an ion-exchanged clinoptilolite, and thereafter subjecting the ion-exchanged clinoptilolite to ion-exchange with a solution containing magnesium cations to produce a magnesium-exchanged clinoptilolite.

DETAILED DESCRIPTION OF THE INVENTION

It is well known that the adsorption properties of many zeolites, and hence their ability to separate gaseous mixtures, can be varied by incorporating various metal cations into the zeolites, typically by ion-exchange or impregnation. For example, U.S. Pat. No. 2,882,243 to Milton describes the use of zeolite A having a silica/alumina ratio of $1.85 \pm 0.5$ and containing hydrogen, ammonium, alkali metal, alkaline earth metal or transition metal cations. The patent states that potassium A zeolite adsorbs water (approximately 3 angstroms) and excludes hydrocarbons and alcohols, while calcium A zeolite absorbs straight-chain hydrocarbons (approximately 5 angstroms) but excludes branched-chain and aromatic hydrocarbons.

Thus, potassium A is commonly referred to as having an effective pore diameter of 3 angstroms and calcium A similary is referred to as having an effective pore diameter of 5 angstroms. The term "effective pore diameter" is used in order to functionally define the pore size of a molecular sieve in terms of what molecules it can absorb rather than actual dimensions which are often irregular and non-circular, e.g. ellipical. D. W. Breck, in ZEOLITE MOLECULAR SIEVES, John Wiley and Sons (1974), hereby incorporated by reference, describes effective pore diameters at pages 633 to 641.

In most cases, the changes in the absorption properties of zeolites following ion-exchange are consistent with a physical blocking of the pore opening by the cation introduced; in general, in any given zeolite, the larger the radius of the ion introduced, the smaller the effective pore diameter of the treated zeolite (for example, the pore diameter of potassium A zeolite is smaller than that of calcium A zeolite), as measured by the size of the molecules which can be adsorbed into the zeolite.

Such is not the case, however, with clinoptilolites which demonstrate an upredictable relationship that is not a simple function of the ionic radii of the cation introduced, i.e., pore blocking. For example, applicants have found that unlike the above-described calcium and potassium ion-exchanged forms of zeolite A, clinoptilolite produces the opposite effect with these two cations. That is, potassium cations, which are larger than calcium cations, provide a clinoptilolite having a larger effective pore diameter than calcium ion-exchanged clinoptilolite. In fact, applicants have found that a calcium ion-exchanged clinoptilolite with a calcium content equivalent to 90% of its ion-exchange capacity defined by its aluminum content essentially excludes both nitrogen and methane. On the other hand, a potassium ion-exchanged clinoptilolite with a potassium content equivalent to 95% of its ion-exchange capacity adsorbs both nitrogen and methane rapidly. Here, the clinoptilolite containing the cation with the larger ionic radii, i.e., potassium, has a larger pore than the clinoptilolite containing the cation with the smaller ionic radii, i.e., calcium.

More unexpectedly applicants have found that magnesium ion-exchanged clinoptilolite has pore openings between that of calcium ion-exchanged clinoptilolite and potassium ion-exchanged clinoptilolite. Magnesium has an ionic radii of 0.65 angstroms versus 0.99 angstroms for potassium. See F. A. Cotton, G. Wilkinson, ADVANCED INORGANIC CHEMISTRY, Interscience Publishers (1980). By extrapolating the correlation between pore size and ionic radii observed on calcium ion-exchanged clinoptilolite and potassium ion-exchanged clinoptilolite, one would expect magnesium ion-exchanged clinoptilolite to have a smaller pore than calcium ion-exchanged clinoptilolite, which would hence exclude nitrogen. But in fact magnesium ion-exchanged clinoptilolite adsorbs nitrogen rapidly but adsorbs methane very slowly, therefore, it is a superior adsorbent for the rate selective separation of nitrogen from methane.

Thus, applicants' invention is focussed on the use of certain magnesium containing clinoptilolites for separating nitrogen and smaller molecules from methane and larger molecules. Without wishing to be bound to any particular theory, it is thought that the magnesium-containing clinoptilolite has improved mass transfer properties which, due to the larger effective pore diameter than the calcium ion-exchanged clinoptilolite, allow easy transport of nitrogen molecules, yet provided sufficient resistance to methane and larger molecules to enable the separation to occur.

The clinoptilolites used in the process of the present invention may be natural or synthetic clinoptilolites. However, natural clinoptilolites are variable in composition and chemical analysis shows that the cations in clinoptilolite samples from various mines and even within a single deposit can vary widely. Moreover, natural clinoptilolites frequently contain substantial amounts of impurities, especially soluble silicates, which may alter the adsorption properties in the aggregation of pelletization of the clinoptilolite (discussed in more detail below), or may cause undesirable side-effects which may inhibit practicing this invention. As an example of the composition variations in natural clinoptilolites, the following Table 1 set forth the chemical analysis of several clinoptilolite ore samples.

TABLE 1

| | Ore No. | | | | |
|---|---|---|---|---|---|
| | 1 | 2 | 3 | 4 | 5 |
| | | | Source No. | | |
| | 1 | 2 | 3 | 2 | 1 |
| Wt. % dry basis | | | | | |
| SiO$_2$ | 76.37 | 76.02 | 75.24 | 76.67 | 76.15 |
| Al$_2$O$_3$ | 12.74 | 13.22 | 12.62 | 13.95 | 12.90 |
| MgO | 0.55 | 0.77 | 2.12 | 0.76 | 0.33 |
| CaO | 0.55 | 2.19 | 2.72 | 2.27 | 1.04 |
| Na$_2$O | 3.86 | 3.72 | 2.25 | 3.26 | 4.09 |
| K$_2$O | 4.21 | 2.11 | 2.17 | 1.93 | 4.08 |
| Other* | 1.72 | 1.98 | 2.88 | 1.16 | 1.41 |
| | 100.00 | 100.00 | 100.00 | 100.00 | 100.00 |
| Cation Concentration mmol/gm | | | | | |
| Si | 12.73 | 12.67 | 12.54 | 12.78 | 12.69 |
| Al | 2.50 | 2.59 | 2.47 | 2.74 | 2.53 |
| Mg | 0.14 | 0.19 | 0.53 | 0.19 | 0.08 |
| Ca | 0.10 | 0.39 | 0.49 | 0.41 | 0.19 |
| Na | 1.25 | 1.20 | 0.73 | 1.05 | 1.32 |
| K | 0.89 | 0.45 | 0.46 | 0.41 | 0.87 |

*Includes the following oxides: Fe$_2$O$_3$, SrO, BaO

It can be seen from Table 1 that the magnesium content of the ore samples can vary quite substantially, especially when considered in view of the total theoretical ion-exchange capacity based on aluminum content. This varies from about 6.4 equivalent percent in Ore No. 5 to about 42.6 equivalent percent in Ore No. 3, e.g., for Ore No. 5, using the cation concentrations, $Mg \times 2/Al \times 100 = \%$, $0.081 \times 2/2.530 \times 100 = 6.4\%$. Hence, it is possible to obtain a naturally occurring clinoptilolite that has a sufficient quantity of magnesium cations, in combination with other cations, to cause the selective adsorption of nitrogen over methane.

However, the cation content based upon the theoretical ion-exchange capacity of the aluminum content is often not truly indicative of the ion-exchangeable cation content. Natural zeolites often contain non-zeolitic minerals which contain unexchangeable cations. Hence, while the non-exchangeable cations appear in the chemical analysis, they do not influence the adsorption properties in the same way that the ion-exchangeable cations do. For example, an extensive ion-exchange can typically bring the particular cation to the level of about 85-95% of its ion-exchange capacity but residual Na, K, Mg, Ca cations nonetheless typically appear in the range of 5-15% of the ion-exchange capacity.

Since the amount of non-exchangeable cations can vary, a simple definition of cation content that does not distinguish between exchangeable and non-exchangeable cations is inadequate for purposes of the present invention. Accordingly, applicants have defined the magnesium cation content of the clinoptilolite in terms of the equivalent percent of ion-exchangeable cations in the clinoptilolite. The amount of ion-exchangeable cation is determined by thoroughly ion-exchanging the clinoptilolite by continuous purging in ion-exchange vessel with a solution having a particular cation in a concentration of at least 1 mol/liter and in an amount of at least 10-fold the total ion-exchange capacity and then analyzing the clinoptilolite for the remaining cations other than the particular cations used in the ion-exchange. In accordance with the definition of the present invention, the amount of other cations remaining are assigned a zero baseline. For example, the procedure for determining the equivalent percent of ion-exchangeable magnesium cations of an ore having a magnesium content of 10 equivalent percent of the total theoretical ion-exchange capacity based on aluminum content is as follows; the ore is ion-exchanged with a solution having a 20-fold excess of sodium cations in concentration of 2 mol/liter. An analysis of the sodium-exchanged clinoptilolite shows 6 equivalent percent remaining. Therefore, the 6 equivalent percent are not ion-exchangeable and 4 equivalent percent are ion-exchangeable magnesium cations.

Often, due to the above-described compositional variations, it is desirable to treat the natural clinoptilolite with a thorough ion-exchange to create a uniform starting material. For this initial ion-exchange, it is important to use a cation of reasonably high ion-exchange selectivity so it can effectively displace a substantial portion of the variety of cations originally existing in the natural zeolite. However, it is also important to not use a cation of overly high selectivity, otherwise it would make further tailoring of the adsorption properties of the clinoptilolite by ion exchange difficult. The cations suitable to provide compositional uniformity in accordance with the present invention include sodium, potassium, calcium, lithium, barium, strontium, zinc, copper, cobalt, and manganese. It is often economically advantageous, and preferred, to use sodium or potassium for this purpose. The ion-exchanged clinoptilolite can then be further ion-exchanged with magnesium cations to establish the desired level. It is, of course, possible to ion-exchange the clinoptilolite directly with magnesium without an initial ion-exchange.

Moreover, in addition to providing compositional uniformity, the various metal cations described above can be ion-exchanged into the clinoptilolite in order to compensate for inherent differences in the naturally occurring raw material thereby enhancing the performance for separating nitrogen and smaller molecules from methane and larger molecules. For example, despite the unpredictability of ion-exchanging clinoptilolite, applicants have determined that the effective pore diameter of the clinoptilolite molecular sieves can be increased by ion-exchanging with potassium, strontium, or barium cations, with potassium being a preferred cation for this purpose. On the other hand, the effective pore diameter of the clinoptilolite can be decreased by ion-exchanging with calcium, sodium, or lithium cations.

Applicants have found that the clinoptilolite of the present invention must have a magnesium cation content that is sufficient to cause nitrogen to be selectively adsorbed on the clinoptilolite molecular sieve. The precise magnesium content will be dependent on the content of other cations present in the clinoptilolite, but will be at least about 5 equivalent percent of the total ion-exchangeable cation content. It is preferred that the magnesium cation content be from about 5 to 85 equivalent percent, more preferably from about 10 to 65 and most preferably from 20 to 45 equivalent percent of the ion-exchangeable cations.

Accordingly, the above-described cations, i.e., sodium, potassium, lithium, calcium, barium, strontium, zinc, copper, cobalt, iron, manganese and mixtures thereof used to treat compositional variations, can be ion-exchanged into the clinoptilolite in addition to magnesium cations in order to produce enhanced adsorption characteristics. When such additional cations are present or ion-exchanging is used to enhance the performance for the separation of nitrogen and smaller molecules from methane and larger molecules, it is desirable that the cations other than magnesium comprise not more than about 95 equivalent percent of the ion-exchangeable cations in the clinoptilolite.

In order to obtain the desired adsorption characteristics, it is often necessary to employ ion-exchange procedures as described above. Hence, in preferred aspects of the present invention, the clinoptilolite contains specified levels of certain other cations in addition to magnesium. A preferred range for potassium cation content is from about 2 to 80 equivalent percent, more preferably from about 10 to 70 equivalent percent. A preferred range of sodium cation content is from about 2 to 40 equivalent percent, more preferably from about 4 to 35 equivalent percent. The concentration of other ion-exchangeable cations, e.g., calcium cations, will typically be less than about 25 equivalent percent and preferably less than 20 equivalent percent. The ranges set forth above are based on equivalent percent of the ion-exchangeable cations as hereinbefore described.

Since clinoptilolite is a natural material, the particle sizes of the commercial product varies, and the particle size of the clinoptilolite may affect the speed and completeness of the ion-exchange reaction. In general, it is recommended that the particle size of the clinoptilolite used in the ion-exchange reaction be not greater than about 8 U.S. mesh. Although the particle sizes of many commercial clinoptilolites are greater, their particle sizes are readily reduced by grinding or other techniques which will be familiar to those skilled in the ion-exchange of molecular sieves.

Techniques for the ion-exchange of zeolites such as clinoptilolite are well-known to those skilled in the molecular sieve art, and hence will not be described in detail herein. When an ion-exchange is to be performed, the cation is conveniently present in the solution in the form of its chloride. To secure maximum replacement of the original clinoptilolite cations, it is recommended that the ion-exchange be conducted using a solution containing a quantity of the cation to be introduced which is from about 2 to about 100 times the ion-exchange capacity of the clinoptilolite. Typically the ion-exchange solution will contain from about 0.1 to about 5 moles per liter of the cation, and will be contacted with the original clinoptilolite for at least about 1 hour in a column, with solution flowing once through. The ion-exchange may be conducted at ambient temperature, although in many cases carrying out the ion-exchange at elevated temperatures, usually less than 100° C., accelerates the ion-exchange process.

As hereinbefore noted, it is typically found that, even after the most exhaustive ion-exchange, a proportion, i.e., from about 5 to 15 weight percent, of the original clinoptilolite cations cannot be replaced by other cations. However, the presence of this small proportion of the original clinoptilolite cations does not materially interfere with the use of the ion-exchanged clinoptilolites in the process of the present invention.

When the clinoptilolites of the present invention are to be used in industrial adsorbers, it may be preferred to aggregate (pelletize) the modified clinoptilolite to control the macropore diffusion, or else in an industrial size adsorption column pulverulent clinoptilolite may compact, thereby blocking, or at least significantly reducing flow through, the column. Those skilled in molecular sieve technology are aware of conventional techniques for aggregating molecular sieves; such techniques usually involve mixing the molecular sieve with a binder, which is typically a clay, forming the mixture into an aggregate, typically by extrusion or bead formation, and heating the formed molecular sieve/clay mixture to a temperature of about 600°–700° C. to convert the green aggregate into one which is resistant to crushing.

The binders used to aggregate the clinoptilolites may include clays, silicas, aluminas, metal oxides and mixtures thereof. In addition, the clinoptilolites may be formed with materials such as silica, alumina, silica-alumina, silica-magnesia, silica-zirconia, silica-thoria, silica-berylia, and silica-titania, as well as ternary compositions, such as silica-alumina-thoria, silica-alumina-zirconia and clays present as binders. The relative proportions of the above materials and the clinoptilolites may vary widely with the clinoptilolite content ranging between about 1 and about 99, preferably between about 60 to 95, percent by weight of the composite. Where the clinoptilolite is to be formed into aggregates prior to use, such aggregates are desirably about 1 to about 4 mm. in diameter.

Before being used in the processes of the present invention, the clinoptilolites need to be activated by calcining, i.e., heating. If the clinoptilolite is aggregated as discussed above, the heat required for aggregation will normally be sufficient to effect activation also, so that no further heating is required. If, however, the clinoptilolite is not to be aggregated, a separate activation step will usually be required. Moreover, if the ore is used directly or ion-exchange is conducted after the aggregation, a separated activation step will be required. Magnesium clinoptilolite can be activated by heating in air, inert atmosphere, or vacuum to a temperature and for a time sufficient to cause the clinoptilolite to become activated. The term "activated" is used herein to describe an adsorbent having a reduced water content relative to being in equilibrium with atmospheric air. Typical activation conditions include a temperature of 350°–700° C. and a time of 30 minutes to 20 hours which is sufficient to reduce the water content of clinoptilolite to about 0.2 to 2 wt. %. Preferably the clinoptilolite is activated by heating in an air or nitrogen purge stream or in vacuum at approximately 300°–650° C. for about 1 hour. The temperature needed for activation of any particular speciment of clinoptilolite can be easily determined by routine empirical tests where typical adsorption properties such as absolute loadings or adsorption rates are measured for samples activated at various temperatures.

Although ion-exchange of clinoptilolite does produce a modified clinoptilolite having a consistent pore size, the exact pore size depends not only upon the metal cation(s) exchanged but also upon the thermal treatment of the product following ion-exchange. In general, there is a tendency for the pore size of the modified clinoptilolites of this invention to decrease with exposure to increasing temperature. Accordingly, in selecting an activation temperature for the modified clinoptilolites, care should be taken not to heat modified clinoptilolites to temperatures for which cause reductions in pore size so severe as to adversely affect the performance of the modified clinoptilolite in the process of the present invention, i.e., higher than 700° C. Although the behavior of the modified clinoptilolites on exposure to heat does limit the activation temperatures which can be employed, the thermal reduction in pore size does offer the possibility of "fine tuning" the pore size of a modified clinoptilolite to optimize its performance in the process of the present invention. It is important to note that the sensitivity of pore size to activation conditions can be reduced by the potassium content in the magnesium containing clinoptilolite.

When performing ion-exchanges in accordance with the present invention of both magnesium and other cations, it is generally preferred to produce the clinoptilolites of the present invention which contain other cations in addition to magnesium by first subjecting raw clinoptilolite to at least one ion-exchange with the desired cation, e.g., sodium or sodium-potassium mixture, aggregating the ion-exchanged clinoptilolite thus produced, and then effecting a subsequent ion-exchange on the aggregated material to introduce the magnesium cations.

The clinoptilolite molecular sieves of the present invention can be used in adsorption processes for the removal of nitrogen, as well as other gases containing molecules having molecular dimensions smaller than nitrogen from feeds containing mixtures thereof with molecules having molecular dimensions equal to or greater than methane. Examples of such molecules smaller than nitrogen include carbon monoxide, carbon dioxide, oxygen and water. Examples of such molecules larger than methane, include other hydrocarbons such as ethylene, ethane, propylene, propane, butanes, and butenes, carbon tetrachloride and other halo-carbons. Dimensions for various molecules are provided in Table 8.14, page 636, of D. W. Breck, ZEOLITE MOLECULAR SIEVES, John Wiley and Sons, 1974, herein incorporated by reference. It should be noted that for purposes of the present invention, the Pauling dimensions, which include both length and width dimensions, are thought to more representatively characterize the actual molecular geometry than the kinetic diameter dimensions also provided in Table 8.14.

The amount of nitrogen present in the feed is not critical to performing the process and can be as low as 1 mole percent or as high as about 80 mole percent. Typically, the nitrogen content will be in the range of about 5 to 50 mole percent. When the nitrogen content is much greater than about 50 mole percent the equipment sizes can become prohibitively large.

The present invention can be performed by virtually any known adsorption cycle such as pressure swing (PSA), thermal swing, displacement purge, or nonadsorbable purge (i.e., partial pressure reduction). However, due to the aforementioned improved mass transfer properties associated with the magnesium ion-exchanged clinoptilolite as opposed to calcium ion-exchanged clinoptilolite, the process of the present invention can advantageously be performed using a pressure swing cycle. It is desirable to utilize a pressure swing type process at a temperature and pressure effective for adsorption and desorption of nitrogen, with the temperature preferably maintained in the range from about −50° to +100° C., and more preferably about 0° to 50° C., the pressure during adsorption from about 0.2 psia to 1500 psia, and preferably about 50 psia to 500 psia, and more preferably about 75 to 350 psia, and the pressure during desorption being lower than during adsorption and effective to cause the desorption of nitrogen, preferably from about 0.1 torr to 150 psia, more preferably from about 0.1 torr to 15 psia and most preferably from about 0.1 torr to 250 torr. The cyclic process can comprise additional adsorption and regeneration steps as well as intermediate depressurization and purging steps.

As noted previously, nitrogen and methane are frequently present together in natural gas or well-head gas. These streams frequently contain various hydrocarbons as well as gases having molecular dimensions smaller than nitrogen such as $CO_2$, $H_2O$, and $O_2$ and others between nitrogen and methane such as $H_2S$ and COS. These intermediately sized molecules can also be adsorbed by the magnesium-containing clinoptilolite. However, since these molecules are often more strongly adsorbed than nitrogen, they may not be desorbed completely in PSA process cycle for nitrogen methane separation. If there is a sufficient quantity of such impurities, they may eventually deactivate the clinoptilolite adsorbent. Under such conditions, it may be desirable to remove them from the feed gas prior to the nitrogen adsorption in order to avoid co-adsorption of these molecules.

The following examples are provided for illustrative purposes and are not intended to limit the scope of the claims that follow.

EXAMPLE I

Preparation of Ion-Exchanged Clinoptilolites

The ore samples used for ion-exchanging were from ore sources 1 and 2 shown in Table 1. Ore source 3 was not used for ion-exchanging but was tested for adsorption rate along with ore samples 1 and 2 as described in Example 3. Ore source 1 was obtained from East West Minerals Co., San Salito, Calif. Ore source 2 was obtained from Steelhead Resource Inc., Spokane, Wash. Ore source 3 was obtained from Double Eagle Petroleum Minerals Co., Casper, Wyo.

Both glass and stainless steel columns were used for the ion-exchange. When glass columns were used, the bottom portion of the column was packed with glass beads for use as a preheating section and the top portion was packed with clinoptilolite either in meshed ore form (30×50 mesh or 8×12 mesh) or in 1/16" pellets which was made by bonding the ore powder with 5% kaolin clay. The column was wrapped with electric heating tape to supply heat. When stainless steel columns were used, a steam jacket was used to heat the column. The term "30×50 mesh," for example, denotes the U.S. Sieve Series size of 0.595 mm ×0.297 mm as shown in Table 21-12, of R. H. Perry, C. H. Chilton, CHEMICAL ENGINEERS HANDBOOK, McGraw Hill Book Co., 5th Edition (1973).

The chloride salt solution of the selected cation (i.e., Na, K, Mg, Ca etc.) in a concentration of 0.2 to 2M (2 molar) was used. The clinoptilolite was first washed with about 5 to 20 bed volumes of water then the solution was pumped into the column to start ion-exchange. The solution was heated to about 90° C. in the glass beads section (for glass column) or preheated in a steam jacked pot (for steel column) before passing to the clinoptilolite bed. The temperature of the clinoptilolite section was kept at 90° C. in both the steel and glass columns. Amount of salt equal to 4 to 20 times the total ion-exchange capacity of the clinoptilolite in the column was used. The specific procedures used for each sample are set forth below. The salt solution was pumped through the column slowly in a time span of 4 to 16 hours. After the ion-exchange was completed, the clinoptilolite was washed with 10 to 20 bed volumes of water and air dried. The results of chemical analysis of the samples are given in Table 2.

Sample 1 Na-Clinoptilolite: Ore from source 1 in 30×50 mesh form was ion-exchanged with a 1.9M NaCl solution equal to 20 times of the total ion-exchange capacity of the sample. The results of chemical analysis are given in Table 2. It contains 2.04 mmol/gm of Na, 0.3 mmol/gm of K, 0.05 mmol/gm of Mg, and 0.05 mmol/gm of Ca. The sum of the above cation concentration is 100% of the theoretical ion-exchange capacity calculated from its aluminum content. The sodium content is 80% of the theoretical ion-exchange capacity.

Sample 2 Na-Clinoptilolite: Ore from source 1 in 8×12 mesh form was ion-exchanged like sample 1. The chemical analysis results are given in Table 2. It contains 2.2 mmol/gm of Na, 0.21 mmol/gm of K, 0.11 mmol/gm of Mg and 0.18 mmol/gm of Ca. The sum of above cation concentration is 120% of the theoretical ion-exchange capacity calculated from its aluminum content. The sodium content is 90% of the theoretical ion-exchange capacity. Apparently some of the cations are not zeolitic and hence do not effect the adsorption properties of sample 2.

Sample 3 Na-Clinoptilolite: Ore powder from source 2 was ion-exchanged with a 2M NaCl solution of 20 times its ion-exchange capacity. The Na-clinoptilolite was bonded with 5% Avery clay (a form of kaolin) and extruded into 1/16" pellets. The pellets were fired at 600° C. to give the finished product. The chemical analysis results are given in Table 2. It contains 2.2 mmol/gm of Na, 0.28 mmol/gm of K, 0.1 mmol/gm of Mg and 0.042 mmol/gm of Ca. The sum of the above cation concentration is 93% of the theoretical ion-exchange capacity calculated from aluminum content. This number appears to be low because a portion of the aluminum is from the clay binder which does not have ion-exchange capacity. The sodium content is 74% of the theoretical ion-exchange capacity.

Sample 4 Ca-Clinoptilolite: A portion of sample 1 was ion-exchanged with a 0.25M $CaCl_2$ solution of 10-fold of its ion-exchange capacity. The chemical analysis of sample is given in Table 2. It contains 0.08 mmol/gm Na; 0.2 mmol/gm K, 0.06 mmol/gm Mg and 1.17 mmol/gm (2.34 mequ./gm) Ca. The sum of above cation is 105% of the theoretical ion-exchange capacity calculated from aluminum content. Calcium content is 90% of the theoretical ion-exchange capacity.

Sample 5 K-Clinoptilolite: Ore from source 1 in 8×12 mesh form was ion-exchanged with a 1M KCl solution of 10 times its ion-exchange capacity. The chemical analysis of the sample is given in Table 2. It contains 0.11 mmol/gm of Na, 2.25 mmol/gm of K, 0.09 mmol/gm of Mg and 0.13 mmol/gm of Ca. The sum of the above cation concentration is 118% of the theoretical ion-exchange capacity calculated from aluminum content. The potassium content is 95% of the theoretical ion-exchange capacity.

Sample 6 Mg-Clinoptilolite: A portion of sample 2 was ion-exchanged with a 0.3M $MgCl_2$ solution of 4 times its ion-exchange capacity. The chemical analysis of the sample is given in Table 2. It contains 0.8 mmol/gm of Na, 0.35 mmol/gm of K, 0.7 mmol/gm of Mg and 0.12 mmol/gm of Ca. The Mg content is about 49.1% of the theoretical ion-exchange capacity.

Sample 7 Mg-Clinoptilolite: A portion of sample 3 was ion-exchanged with a 0.3M $MgCl_2$ solution of 4 times its ion-exchange capacity. The chemical analysis of the sample is given in Table 2. It contains 1.1 mmol/gm of Na, 0.33 mmol/gm of K, 0.66 mmol/gm of Mg and 0.07 mmol/gm of CA. The Mg content is about 45.4% of the theoretical ion-exchange capacity.

Sample 8 MgK-Clinoptilolite: Ore from source 1 in 8×12 mesh was ion-exchanged with a mixed solution of 2M NaCl and 0.1M KCl of 21 times its ion-exchange capacity, then further ion-exchanged with a 0.3M MgCl$_2$ solution of 4 times its ion-exchange capacity. The chemical analysis of the sample is given in Table 2. It contains 0.48 mmol/gm of Na, 1.05 mmol/gm of K, 0.54 mmol/gm of Mg and 0.13 mmol/gm of Ca. The Mg content is about 43% and K content is about 42% of the theoretical ion-exchange capacity.

Sample 9 K-Clinoptilolite 1/16" Pellets: A portion of sample 3 was ion-exchanged with a 0.6M KCl solution of 10 times its ion-exchange capacity. The chemical analysis of the sample is given in Table 2. It contains 0.18 mmol/gm of Na, 2.1 mmol/gm of K, 0.09 mmol/gm of Mg and 0.05 mmol/gm of Ca. The potassium content is about 82% of the theoretical ion-exchange capacity.

Sample 10 MgK-Clinoptilolite 1/16" Pellets: A portion of sample 3 was ion-exchanged with a 1M KCl solution of 12 times its ion-exchange capacity, then further ion-exchanged by equilibrium with a MgCl$_2$ solution of 1 times its total ion-exchange capacity. The chemical analysis of the sample is given in Table 2. It contains 0.29 mmol/gm of Na, 1.87 mmol/gm of K, 0.17 mmol/gm of Mg, 0.03 mmol/gm of Ca. The K content is about 65% and Mg content is about 5% of the theoretical ion-exchange capacity.

TABLE 2

| | Sample No. | | | | |
|---|---|---|---|---|---|
| | 1 | 2 | 3 | 4 | 5 |
| | Ore Source No. | | | | |
| | 1 | 1 | 2 | 1 | 1 |
| Wt. % dry basis | | | | | |
| SiO$_2$ | 79.12 | 76.71 | 75.17 | 78.29 | 76.00 |
| Al$_2$O$_3$ | 13.03 | 12.75 | 15.12 | 13.26 | 12.06 |
| MgO | 0.22 | 0.45 | 0.41 | 0.22 | 0.34 |
| CaO | 0.28 | 0.99 | 0.24 | 6.57 | 0.74 |
| Na$_2$O | 6.33 | 6.91 | 6.78 | 0.26 | 0.35 |
| K$_2$O | 1.47 | 0.99 | 1.30 | 0.95 | 10.61 |
| Other | | 1.21 | 0.98 | 0.44 | |
| | 100.45 | 100.00 | 100.00 | 100.00 | 100.09 |
| Cation Concentration mmol/gm | | | | | |
| Si | 13.19 | 12.79 | 12.53 | 13.05 | 12.67 |
| Al | 2.56 | 2.50 | 2.97 | 2.60 | 2.37 |
| Mg | 0.05 | 0.11 | 0.10 | 0.06 | 0.09 |
| Ca | 0.05 | 0.18 | 0.04 | 1.17 | 0.13 |
| Na | 2.04 | 2.23 | 2.19 | 0.09 | 0.11 |
| K | 0.31 | 0.21 | 0.28 | 0.20 | 2.25 |
| Ion-Exchangeable Cation Content, %; | | | | | |
| Mg | — | — | — | — | — |
| Ca | — | — | — | 86 | — |
| Na | 76 | 85 | 65 | — | — |
| K | — | — | — | — | 87 |
| Calculation based on Sample | 4–5 | 4–5 | 9–10 | 1 | 2 |
| | Sample No. | | | | |
| | 6 | 7 | 8 | 9 | 10 |
| | Ore Source No. | | | | |
| | 1 | 2 | 1 | 2 | 2 |
| Wt. % dry basis | | | | | |
| SiO$_2$ | — | 76.85 | 75.48 | 74.33 | 72.30 |
| Al$_2$O$_3$ | — | 12.77 | 14.84 | 13.00 | 14.50 |
| MgO | 2.74 | 2.16 | 2.66 | 0.37 | 0.70 |
| CaO | 0.68 | 0.74 | 0.33 | 0.30 | 0.19 |
| Na$_2$O | 2.65 | 1.43 | 3.25 | 0.55 | 0.91 |
| K$_2$O | 1.48 | 4.94 | 1.54 | 9.87 | 8.80 |
| Other | — | 1.12 | 1.90 | 1.59 | 2.60 |
| | | 100.00 | 100.00 | 100.00 | 100.00 |
| Cation Concentration mmol/gm; | | | | | |
| Si | — | 12.81 | 12.58 | 12.39 | 12.05 |
| Al | — | 2.50 | 2.91 | 2.55 | 2.84 |
| Mg | 0.68 | 0.54 | 0.66 | 0.09 | 0.17 |
| Ca | 0.12 | 0.13 | 0.06 | 0.05 | 0.03 |
| Na | 0.86 | 0.46 | 1.05 | 0.18 | 0.29 |
| K | 0.31 | 1.05 | 0.33 | 2.10 | 1.87 |
| Ion-Exchangeable Cation Content, %; | | | | | |
| Mg | 45 | 36 | 36 | — | 5 |
| Na | 30 | 14 | 32 | — | — |
| K | 4 | 33 | 3 | 73 | 56 |
| Calculation based on Sample | 2 | 3 | 2 | 3 | 3 |

In the above Table, the ion-exchangeable cation content is calculated as follows:

For Sample 7: The magnesium content of sample 3, i.e., same starting material as sample 7, after sodium exchange is calculated by dividing the magnesium content 0.10×2 (correction for +2 valence) by the aluminum content 2.97 to yield 6.7% which represents the non-exchangeable magnesium content. Similarly, the magnesium content of sample 7 is calculated; 0.54×2/2.50×100=43.2%. The difference, 43.2-6.7=36.5%, represents ion-exchangeable magnesium content. The potassium and sodium contents are similarly calculated as follows:

$$K = (1.05/2.50 - 0.28/2.97) \times 100 = 32.6\%$$

$$Na^* = (0.46/2.50 - ((0.085/2.60 + 0.11/2.36)/2) \times 100 = 14.4\%$$

*The non-exchangeable Na cation content was determined using samples 4 and 5 as a basis to provide an average non-exchangeable Na content.

EXAMPLE 2

Adsorption Rate Measurements for Nitrogen and Methane

The absorption rates of nitrogen and methane were measured with a Sartorius electromagnetic pressure micro balance Model 4436 manufactured by Sartorius Corp. Of West Germany. For each experiment, the rate was measured at two pressures, 1 atm and 5 atm. An activated sample was first reactivated at room temperature with vacuum pump, then the pressure was raised to 1 atm. The weight increase was recorded. After the sample reached equilibrium, the sample was reactivated at room temperature. The 5 atm measurement was conducted on the reactivated sample. The absorption loading and average rate selectivity at 0.4 minutes were compared. The results are listed in Tables 3 and 4. The data were evaluated in terms of both absorption loadings of nitrogen and selectivity for nitrogen. In order for an absorbent to be useful commercially, it must have sufficient capacity for nitrogen as well as sufficient selectivity. Applicants have determined that suitable clinoptilolites for use in accordance with the present invention are those which have a nitrogen loading of 0.2 milimoles/gram or greater and a selectivity factor of 5 or greater at a pressure of 1 atmosphere.

EXAMPLE 2-1

Na-Clinoptilolite

Sample 2 was calcined under vacuum at 400° C., then its nitrogen and methane adsorption rates were measured.

EXAMPLE 2-2

Ca-Clinoptilolite

Sample 4 was calcined under vacuum at 400° C., then its nitrogen and methane absorption rates were measured.

EXAMPLE 2-3

K-Clinoptilolite

Sample 5 was calcined in a rotary kiln at 500° C., then its nitrogen and methane absorption rates were measured.

EXAMPLE 2-4

K-Clinoptilolite Pellets

Sample 9 was calcined in a Blue M oven at 650° C., then its nitrogen and methane absorption rates were measured.

EXAMPLE 2-5

Mg-Clinoptilolite

Sample 6 was calcined in a rotary kiln at 400° C., then the nitrogen and methane absorption rates were measured.

EXAMPLE 2-6

Mg-Clinoptilolite 1/16"Pellets

Sample 7 was calcined in a rotary kiln at 500° C., then the nitrogen and methane absorption rate were measured.

EXAMPLE 2-7

MgK-Clinoptilolite Meshes

Sample 8 was dried to 3.2% residual water then calcined at 500° C. in a rotary kiln, then the nitrogen and methane adsorption rates were measured.

EXAMPLE 2-8

MgK-Clinoptilolite Pellets

Sample 10 was calcined in a rotary kiln at 500° C., then the absorption rate of nitrogen and methane were measured.

EXAMPLE 3

Separation of Carbon Monoxide From Methane

The micro balance and testing method of Example 2 was used to measure the absorption rate for carbon monoxide and methane. The separation of carbon monoxide from methane and other hydrocarbons has industrial importance in other areas in addition to the natural gas and petroleum gas recovery applications hereinbefore set forth. For example, it is often desirable to separate carbon monoxide from methane-containing reformer effluent streams and the like. The same standards for absorbent suitability were used for Example 3 as for Example 2 as applied to carbon monoxide instead of methane.

EXAMPLE 3-1

Mg-Clinoptilolite

Sample 6 was calcined under vacuum at 400° C. and then the absorption rates of carbon monoxide and methane were measured.

EXAMPLE 3-2

MgK-Clinoptilolite

Sample 10 was calcined in a rotary kiln 500° C. and then the absorption rates of carbon monoxide and methane were measured.

TABLE 3

Adsorption Rate Data for $N_2/CH_4$ Separation at 1 Atm. for Ion-Exchanged Samples

| Sample No. | Gases | Loading at 0.4 minute mmol/gm | Ave. Rate mmol/gm/ minute | Ave. Selec. $S(N_2/CH_4)$ |
|---|---|---|---|---|
| 2-NaClino | $N_2$ | 0.12 | 0.3 | 9.2 |
|  | $CH_4$ | 0.01 | 0.03 |  |
| 4-CaClino | $N_2$ | 0.11 | 0.27 | 1.6 |
|  | $CH_4$ | 0.07 | 0.17 |  |
| 5-KClino | $N_2$ | 0.38 | 0.94 | 1.9 |
|  | $CH_4$ | 0.20 | 0.50 |  |
| 9-KClino | $N_2$ | 0.29 | 0.72 | 4.1 |
|  | $CH_4$ | 0.07 | 0.18 |  |
| 6-MgClino | $N_2$ | 0.24 | 0.6 | 18.4 |
|  | $CH_4$ | 0.01 | 0.03 |  |
| 7-MgClino | $N_2$ | 0.19 | 0.48 | 4.9 |
|  | $CH_4$ | 0.04 | 0.1 |  |
| 8-MgClino | $N_2$ | 0.28 | 0.7 | 200 |
|  | $CH_4$ | 0.00 | 0.003 |  |
| 10-MgKClino | $N_2$ | 0.24 | 0.61 | 10.2 |
|  | $CH_4$ | 0.02 | 0.06 |  |

TABLE 4

Adsorption Rate Data for $N_2/CH_4$ Separation At 5 Atm. for Ion-Exchanged Samples

| Sample No. | Gases | Loading at 0.4 minute mmol/gm | Ave. Rate mmol/gm/ minute | Ave. Selec. $S(N_2/CH_4)$ |
|---|---|---|---|---|
| 2-NaClino | $N_2$ | 0.29 | 0.73 | 15.6 |
|  | $CH_4$ | 0.02 | 0.05 |  |
| 4-CaClino | $N_2$ | 0.10 | 0.26 | 2.0 |
|  | $CH_4$ | 0.05 | 0.13 |  |
| 5-KClino | $N_2$ | 0.79 | 1.98 | 2.0 |
|  | $CH_4$ | 0.90 | 1.00 |  |
| 9-KClino | $N_2$ | 0.64 | 1.60 | 4.3 |
|  | $CH_4$ | 0.15 | 0.37 |  |
| 6-MgClino | $N_2$ | 0.56 | 1.41 | 17.9 |
|  | $CH_4$ | 0.03 | 0.08 |  |
| 7-MgClino | $N_2$ | 0.45 | 1.13 | 3.65 |
|  | $CH_4$ | 0.12 | 0.31 |  |
| 8-MgKClino | $N_2$ | 0.59 | 1.47 | 11.5 |
|  | $CH_4$ | 0.05 | 0.13 |  |
| 10-MgKClino | $N_2$ | 0.65 | 1.63 | 7.3 |
|  | $CH_4$ | 0.09 | 0.23 |  |

TABLE 5

Adsorption Rate Data for $CO/CH_4$ Separation At 1 Atm. for Ion-Exchanged Samples

| Sample No. | Gases | Loading at 0.4 minute mmol/gm | Ave. Rate mmol/gm/ minute | Ave. Selec. $S(CO/CH_4)$ |
|---|---|---|---|---|
| 6-MgClino | CO | 0.57 | 1.43 | 20 |
|  | $CH_4$ | 0.02 | 0.042 |  |
| 10-MgKClino | CO | 0.43 | 1.09 | 18.1 |
|  | $CH_4$ | 0.02 | 0.06 |  |

TABLE 6

Adsorption Rate Data for CO/CH₄ Separation At 5 Atm. for Ion-Exchanged Samples

| Sample No. | Gases | Loading at 0.4 minute mmol/gm | Ave. Rate mmol/gm/minute | Ave. Selec. S(CO/CH₄) |
|---|---|---|---|---|
| 6-MgClino | CO | 1.0 | 2.5 | 21.1 |
|  | CH₄ | 0.05 | 0.12 |  |
| 10-MgKClino | CO | 0.76 | 1.90 | 11.4 |
|  | CH₄ | 0.07 | 0.17 |  |

The data presented in Tables 3 to 6 illustrate the beneficial effects of utilizing magnesium-containing clinoptilolites in accordance with the present invention for separating nitrogen or smaller molecules, i.e., carbon monoxide, from methane or larger molecules. Those skilled in the art will recognize, however, that certain substantially non-polarizable molecules such as hydrogen or helium will not be readily adsorbable on the clinoptilolites of the present invention even though they have molecular dimensions smaller than nitrogen. Hence, it may not be commercially practical to perform such separations since prohibitively large quantities of adsorbent may be required. The clinoptilolite compositions of samples 6,7,8 and 10, represent suitable compositions based upon applicants' requirements for commercial viability as hereinbefore set forth. Note that the Ca ion-exchanged clinoptilolite, Sample 4, demonstrated a selectivity factor of 2 and hence is unsuitable according to applicants' standards.

It can also be observed from Tables 3 and 4 that the selectivity factor for sample 10 at 1 atm. was 18 for CO/CH₄ and 10 for $N_2/CH_4$. The higher selectivity for CO over $N_2$ can be attributed to the fact that CO has smaller molecular dimensions than $N_2$.

What is claimed is:

1. A process for separating a first gas containing molecules having molecular dimensions equal to or smaller than nitrogen from a feed containing mixtures thereof with at least one other gas containing molecules having molecular dimensions equal to or larger than methane, which comprises contacting the feed with a clinoptilolite molecular sieve that has a magnesium cation content that is sufficient to cause the first gas to be selectively absorbed on the clinoptilolite molecular sieve, said magnesium cation content being at least about 5 equivalent percent of the ion-exchangeable cations in the clinoptilolite molecular sieve, and recovering an effluent having a reduced amount of the first gas relative to the feed.

2. A process according to claim 1 wherein the clinoptilolite molecular sieve has been ion-exchanged with magnesium cations.

3. A process according to claim 1 wherein from about 5 to 85 equivalent percent of the ion-exchangeable cations in the clinoptilolite are magnesium cations.

4. A process according to claim 3 wherein from about 10 to 65 equivalent percent of the ion-exchangeable cations in the clinoptilolite are magnesium cations.

5. A process according to claim 1 wherein the clinoptilolite molecular sieve has been ion-exchanged with at least one cation selected from the group consisting of lithium, potassium, sodium, calcium, barium, strontium, zinc, copper, cobalt, iron and manganese catios, to an extent that not more than about 95 equivalent percent of the ion-exchangeable cations are cations from said group.

6. A process according to claim 5 wherein from about 2 to 80 equivalent percent of the ion-exchangeable cations in the clinoptilolite are potassium cations.

7. A process according to claim 5 wherein from about 2 to 40 equivalent percent of the ion-exchangeable cations in the clinoptilolite are sodium cations.

8. A process according to claim 5 wherein from about 10 to 75 equivalent percent of the ion-exchangeable cations in the clinoptilolite are potassium cations and from about 4 to 35 equivalent percent of the ion-exchangeable cations in the clinoptilolite are sodium cations.

9. A process according to claim 5 wherein from about 5 to 45 equivalent percent of the ion-exchangeable cations in the clinoptilolite are magnesium cations and from about 30 to 80 equivalent percent of the ion-exchangeable cations in the clinoptilolite are potassium cations and from about 4 to 35 equivalent percent of the ion-exchangeable cations in the clinoptilolite are sodium cations.

10. A process according to claim 5 wherein from about 45 to 85 equivalent percent of the ion-exchangeable cations in the clinoptilolite are magnesium cations and from about 2 to 30 equivalent percent of the ion-exchangeable cations in the clioptilolite are potassium cations and from about 4 to 35 equivalent percent of the ion-exchangeable cations in the clinoptilolite are sodium cations.

11. A process according to claim 1 wherein the first gas comprises at least one of carbon monoxide, carbon dioxide, nitrogen and oxygen.

12. A process according to claim 1 wherein the other gas comprises at least one of methane, ethylene, ethane, propylene, propane, a butane and a butene.

13. A process according to claim 1 wherein the feed comprises nitrogen and methane.

14. A process according to claim 1 wherein the feed comprises carbon monoxide and methane.

15. A process according to claim 1 wherein the clinoptilolite molecular sieve is a natural clinoptilolite.

16. A process for separating a first gas containing molecules having molecular dimension equal to or smaller than nitrogen from a feed containing mixtures thereof with at least one other gas containing molecules having molecular dimensions equal to or larger than methane by the selective adsorption of the gas, which comprises the steps of:

(a) passing the feed to an absorber bed containing a clinoptilolite molecular sieve that has a magnesium cation content that is sufficient to cause the first gas to be selectively absorbed on the clinoptilolite molecular sieve, said mangesium cation content being at least about 5 equivalent percent of the ion-exchangeable cations in the clinoptilolite molecular sieve at conditions effective to cause the first gas to be selectively absorbed on said clinoptilolite, said conditions selected from a temperature of from about −50° to 100° C. and at a pressure of from about 0.2 psia to 1500 psia and recovering an effluent having a reduced amount of the first gas relative to the feed, and;

(b) regenerating said absorber bed by desorbing nitrogen therefrom by decreasing the pressure in said absorber bed to below the adsorption pressure of step (a) and to within the range of 0.1 torr to 150 psia.

17. A process according to claim 16 wherein the clinoptilolite molecular sieve has been ion-exchanged with magnesium cations.

18. A process according to claim 16 wherein the clinoptilolite molecular sieve has been ion-exchanged with at least one cation selected from the group consisting of lithium, potassium, sodium, calcium, barium, strontium, zinc, copper, cobalt, iron and manganese cations, to an extent that not more than about 95 equivalent percent of the ion-exchangeable cations are cations from said group.

19. A process according to claim 16 wherein the feed comprises a nitrogen-containing natural gas.

20. A process according to claim 16 wherein the feed comprises a nitrogen-containing petroleum gas.

21. A process according to claim 16 wherein the feed comprises a reformer effluent gas.

22. A process according to claim 16 wherein step (a) is performed at a temperature of from about 0° to 50° C. and at a pressure of from about 50 psia to 500 psia.

23. A process according to claim 16 wherein step (b) is performed at a pressure of from about 0.1 torr to 250 torr.

24. A process for the production of a modified clinoptilolite wherein at least about 5 equivalent percent of the ion-exchangeable cations in the clinoptilolite comprises magnesium cations, said process comprising subjecting a clinoptilolite to at least one ion-exchange with a solution containing any one or more of lithium, potassium, calcium, sodium, barium, strontium, zinc, copper, cobalt, iron and manganese cations, thereby producing an ion-exchanged clinoptilolite, and thereafter subjecting said ion-exchanged clinoptilolite to ion-exchange with a solution containing magnesisum cations to produce a magnesium-exchanged clinoptilolite.

25. A process according to claim 24 wherein from about 5 to 85 equivalent percent of the ion-exchangeable cations in the clinoptilolite are magnesium cations and from about 2 to 80 equivalent percent of the ion-exchangeable cations in the clinoptilolite are potassium cations and from about 2 to 40 equivalent percent of the ion-exchangeable cations in the clinoptilolite are sodium cations.

26. A process according to claim 25 wherein from about 5 to 45 equivalent percent of the ion-exchangeable cations in the clinoptilolite are magensium cations and from about 30 to 80 equivalent percent of the ion-exchangeable cations in the clinoptilolite are potassium cations and from about 4 to 35 equivalent percent of the ion-exchangeable cations in the clinoptilolite are sodium cations.

27. A process according to claim 25 wherein from about 45 to 85 equivalent percent of the ion-exchangeable cations in the clinoptilolite are magnesium cations, from about 2 to 30 equivalent percent of the ion-exchangeable cations in the clinoptilolite are potassium cations and from about 4 to 35 equivalent percent of the ion-exchangeable cations in the clinoptilolite are sodium cations.

28. A process according to claim 24 wherein the ion-exchanged clinoptilolite is admixed with a binder and heated to produce pellets of clinoptilolite bound together by the binder, and the ion-exchange with magnesium cations is effected on the pellets so formed.

29. A process according to claim 28 wherein the binder is a clay binder.

30. A process according to claim 24 wherein the magnesium clinoptilolite is heated at a temperature and for a time sufficient to cause the clinoptilolite to become activated.

31. A process according to claim 30 wherein the magnesium clinoptilolite is heated in air to a temperature of about 300°–650° C. for about 1 hour.

* * * * *